(12) United States Patent
Gupta

(10) Patent No.: US 12,301,561 B2
(45) Date of Patent: May 13, 2025

(54) SECURE ACCESS TO DEVICES IN A VIRTUAL ENVIRONMENT USING SECURITY TOKENS

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 317 days.

(21) Appl. No.: 17/822,956

(22) Filed: Aug. 29, 2022

(65) Prior Publication Data
US 2024/0073205 A1    Feb. 29, 2024

(51) Int. Cl.
*H04L 9/40*    (2022.01)

(52) U.S. Cl.
CPC .......... *H04L 63/0853* (2013.01); *H04L 63/10* (2013.01)

(58) Field of Classification Search
CPC .. H04L 63/10; H04L 63/0807; H04L 63/0853
See application file for complete search history.

(56) References Cited

U.S. PATENT DOCUMENTS

| | | | |
|---|---|---|---|
| 7,395,535 B2 | 7/2008 | Susser et al. | |
| 7,401,358 B1 | 7/2008 | Christie et al. | |
| 7,571,294 B2 | 8/2009 | Safranek et al. | |
| 7,607,175 B2 | 10/2009 | Susser et al. | |
| 7,975,117 B2 | 7/2011 | Peinado et al. | |
| 8,499,151 B2 | 7/2013 | Durham et al. | |
| 8,646,052 B2 | 2/2014 | Vembu et al. | |
| 8,756,696 B1 | 6/2014 | Miller | |
| 8,839,455 B1 | 9/2014 | Tormasov | |
| 8,862,901 B2 | 10/2014 | Rao et al. | |
| 9,117,094 B2 | 8/2015 | Anckaert et al. | |
| 9,575,790 B2 | 2/2017 | Tosa et al. | |
| 10,061,928 B2 | 8/2018 | Wang et al. | |
| 10,176,122 B2 | 1/2019 | Kaplan et al. | |
| 10,216,522 B2 | 2/2019 | Lemay | |
| 10,216,961 B2 | 2/2019 | Ginzton et al. | |
| 10,241,819 B2 | 3/2019 | Chen et al. | |
| 10,657,241 B2 * | 5/2020 | Farraro | G06F 21/35 |
| 11,194,386 B1 * | 12/2021 | Zhao | G06F 3/011 |
| 12,020,692 B1 * | 6/2024 | Ryali | G06T 15/00 |
| 2008/0052709 A1 | 2/2008 | Tang | |
| 2009/0254968 A1 * | 10/2009 | Bussani | H04L 63/102 726/1 |

(Continued)

*Primary Examiner* — Mohammad A Siddiqi

(57) ABSTRACT

A system for provisioning secured access to devices determines a location of a virtual environment in a virtual environment. The prevents access requests to the location where the virtual device is located. The system assigns a first security token to the virtual device. The system receives a request to access the virtual device, where the request is received from an avatar. The system receives a second security token to grant access to the virtual device. The system compares the first security token with the second security token. The system determines whether the second security token corresponds to the first security token. If it is determined that the second security token corresponds to the first security token, the system grants the avatar access to the virtual device. Otherwise, the system denies the avatar access to the virtual device and transmits a locking signal to the virtual device.

20 Claims, 3 Drawing Sheets

(56) References Cited

U.S. PATENT DOCUMENTS

| | | | |
|---|---|---|---|
| 2010/0198653 A1* | 8/2010 | Bromenshenkel | G06Q 30/06 |
| | | | 715/757 |
| 2011/0289224 A1* | 11/2011 | Trott | H04L 65/4038 |
| | | | 709/227 |
| 2012/0226740 A1* | 9/2012 | Nath | H04L 41/082 |
| | | | 709/203 |
| 2015/0381638 A1 | 12/2015 | Capalik et al. | |
| 2016/0035016 A1* | 2/2016 | Spio | G06Q 50/01 |
| | | | 705/27.2 |
| 2016/0155187 A1* | 6/2016 | Paulrajan | G06Q 30/0643 |
| | | | 705/27.2 |
| 2017/0076279 A1* | 3/2017 | Pebbles | G06Q 20/40 |
| 2017/0134436 A1 | 5/2017 | Agarwal et al. | |
| 2017/0223026 A1* | 8/2017 | Amiri | H04L 63/20 |
| 2017/0326457 A1* | 11/2017 | Tilton | G06F 3/011 |
| 2018/0219950 A1* | 8/2018 | Hodge | H04L 63/0861 |
| 2018/0345139 A1* | 12/2018 | Smith | A63F 13/48 |
| 2019/0238488 A1* | 8/2019 | Peng | G06Q 20/0655 |
| 2020/0026922 A1* | 1/2020 | Pekelny | G06V 20/20 |
| 2020/0228524 A1* | 7/2020 | Szafranski | A63F 13/79 |
| 2020/0249749 A1* | 8/2020 | Akman | G06F 3/04815 |
| 2021/0063972 A1* | 3/2021 | Sparks | A61B 5/1114 |
| 2021/0218729 A1* | 7/2021 | Gupta | H04L 67/1097 |
| 2022/0374878 A1* | 11/2022 | Andral | G06Q 20/401 |
| 2022/0392169 A1* | 12/2022 | Simpson | A63F 13/26 |
| 2023/0048912 A1* | 2/2023 | Gasti | G06F 21/6245 |
| 2023/0185929 A1* | 6/2023 | Halstead | G06F 21/31 |
| | | | 713/168 |
| 2024/0022561 A1* | 1/2024 | Ingram | H04L 63/08 |
| 2024/0078297 A1* | 3/2024 | Bhatia | G06F 21/31 |
| 2024/0312130 A1* | 9/2024 | Palermo | H04N 21/25841 |

\* cited by examiner

SECURE ACCESS TO DEVICES IN A VIRTUAL ENVIRONMENT USING SECURITY TOKENS

TECHNICAL FIELD

The present disclosure relates generally to network security, and more specifically to secure access to devices in a virtual environment using security tokens.

BACKGROUND

As the Internet continues to be utilized by an ever-increasing number of users, fraudulent and criminal activity via the Internet also rises. In data transmission through the Internet, the data is exposed to bad actors and cyberattacks. It is challenging to transmit data through the Internet without exposing the data to bad actors and cyberattacks.

SUMMARY

The system described in the present disclosure is particularly integrated into a practical application of provisioning secure access to virtual devices in a virtual environment. This, in turn, provides an additional practical application of improving information security of data stored in the virtual devices. These practical applications lead to the technical advantage of improving information security to virtual devices and data stored in the virtual devices. Therefore, the disclosed system minimizes (or prevents) unauthorized access to the virtual devices. This leads to keeping data stored in virtual devices secured from unauthorized access by bad actors.

The disclosed system is configured to assign security tokens to virtual devices. A security token may represent a digital access key or credential for accessing a virtual device. Without the security token, the virtual device cannot be accessed. In certain embodiments, the virtual device may be a virtual representation of a physical device in the real world. When the security token is assigned to the virtual device, it may also be assigned to the respective physical device. In other words, when the security token is assigned to the virtual device, the security token may be needed to access either of the physical device and the virtual device. For example, a bad actor may gain access to an avatar, impersonate an authorized user and attempt to access the virtual device in the virtual environment. In another example, the bad actor may access the physical device in the real world. Without the security token, the bad actor cannot access either the virtual device or the physical device. Accordingly, the disclosed system provides secure access to virtual devices as well as physical devices using security tokens assigned to virtual devices.

The disclosed system also provides an additional practical application of securing physical devices with security tokens that are assigned to respective virtual devices in the virtual environment. This, in turn, provides an additional practical application of improving information security of data stored in the physical devices. These practical applications lead to the technical advantage of improving information security to physical devices and data stored in the physical devices. Therefore, the disclosed system minimizes (or prevents) unauthorized access to the physical devices. This leads to keeping data stored in physical devices secured from unauthorized access by bad actors.

In one embodiment, a system of provisioning secured access to devices comprises a memory and a processor. The memory is configured to store a first security token. The processor is operably coupled to the memory. The processor is configured to determine a location of a first virtual device in a virtual environment. The processor accesses a first virtual device in a virtual environment. The processor prevents access requests to the location where the first virtual device is located. The processor assigns the first security token to the first virtual device, wherein the first security token is used to prevent unauthorized access to the first virtual device. The processor receives a first request to access the first virtual device, wherein the first request is received from a first avatar. The processor receives a second security token to grant access to the first virtual device. The processor compares the second security token with the first security token. The processor determines whether the second security token corresponds to the first security token. In response to determining that the second security token corresponds to the first security token, the processor grants the first avatar access to the first virtual device. In response to determining that the second security token does not correspond to the first security token, the processor denies the first avatar access to the first virtual device. The processor transmits a locking signal to the first virtual device, wherein the locking signal causes the first virtual device to be locked.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
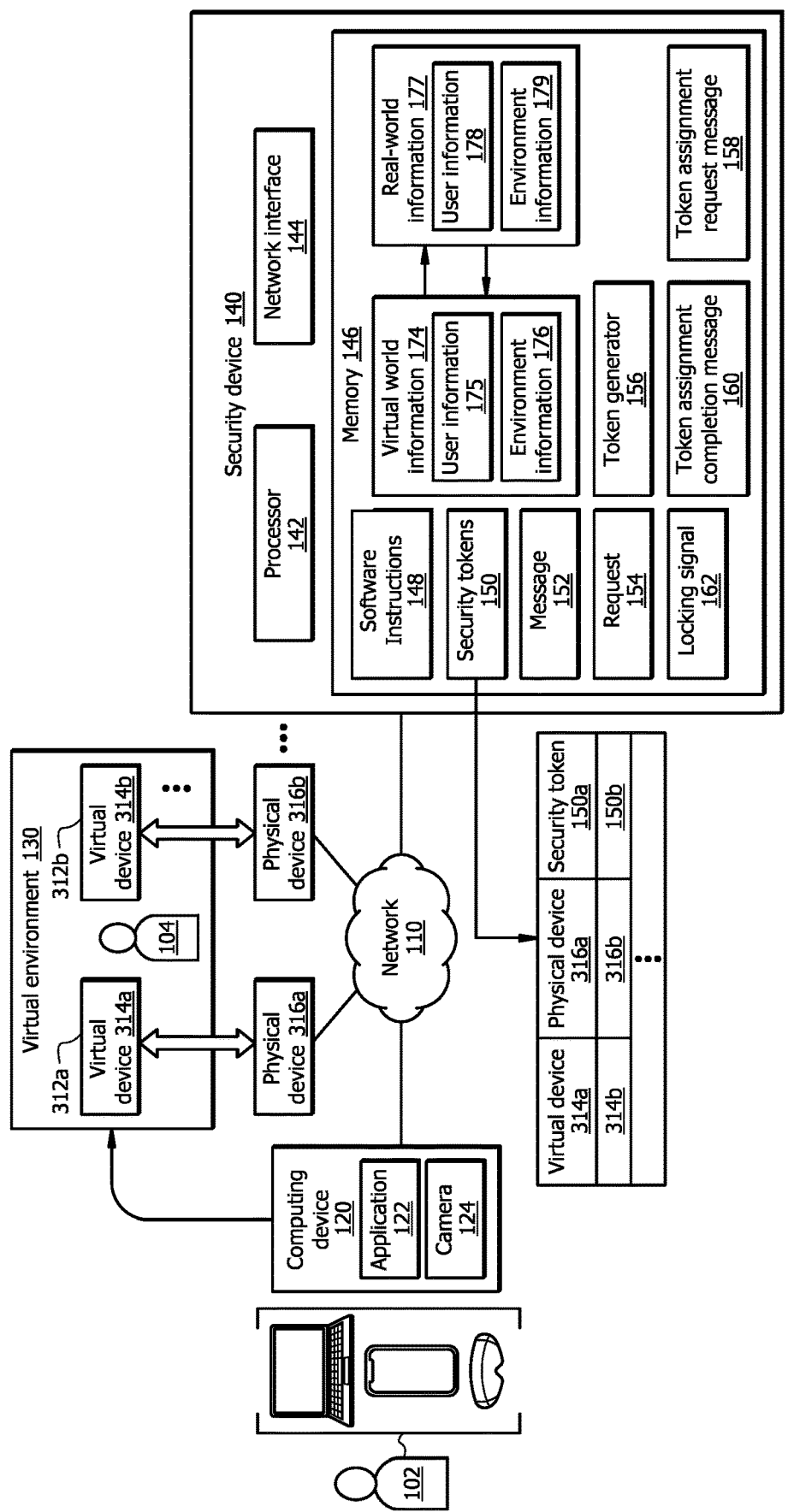
FIG. 1 illustrates an embodiment of a system configured to implement secured access to virtual devices in virtual environments and corresponding physical devices in a real-world environment using security tokens.
Figure 2:
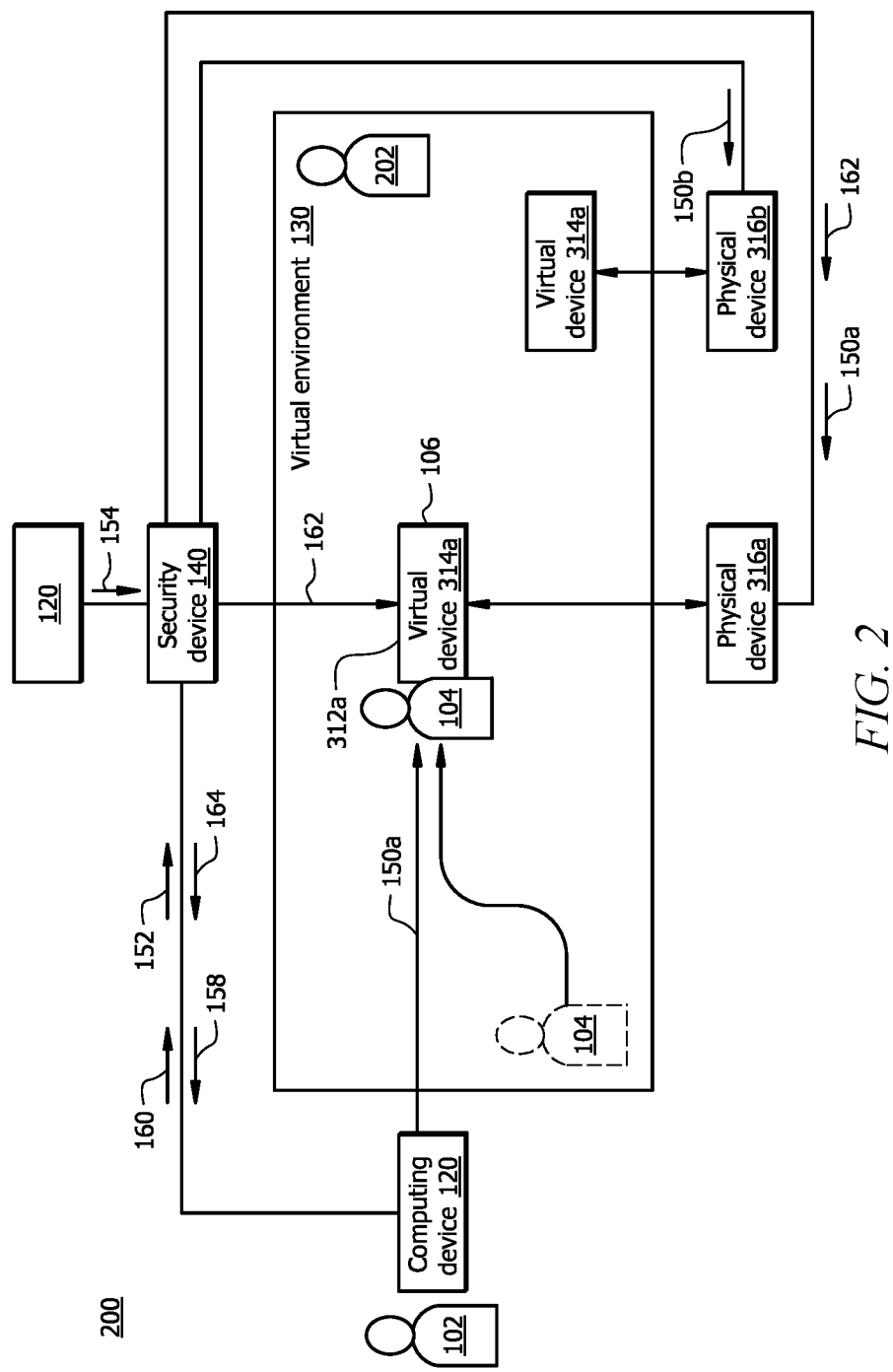
FIG. 2 illustrates an example operational flow of the system of FIG. 1.
Figure 3:
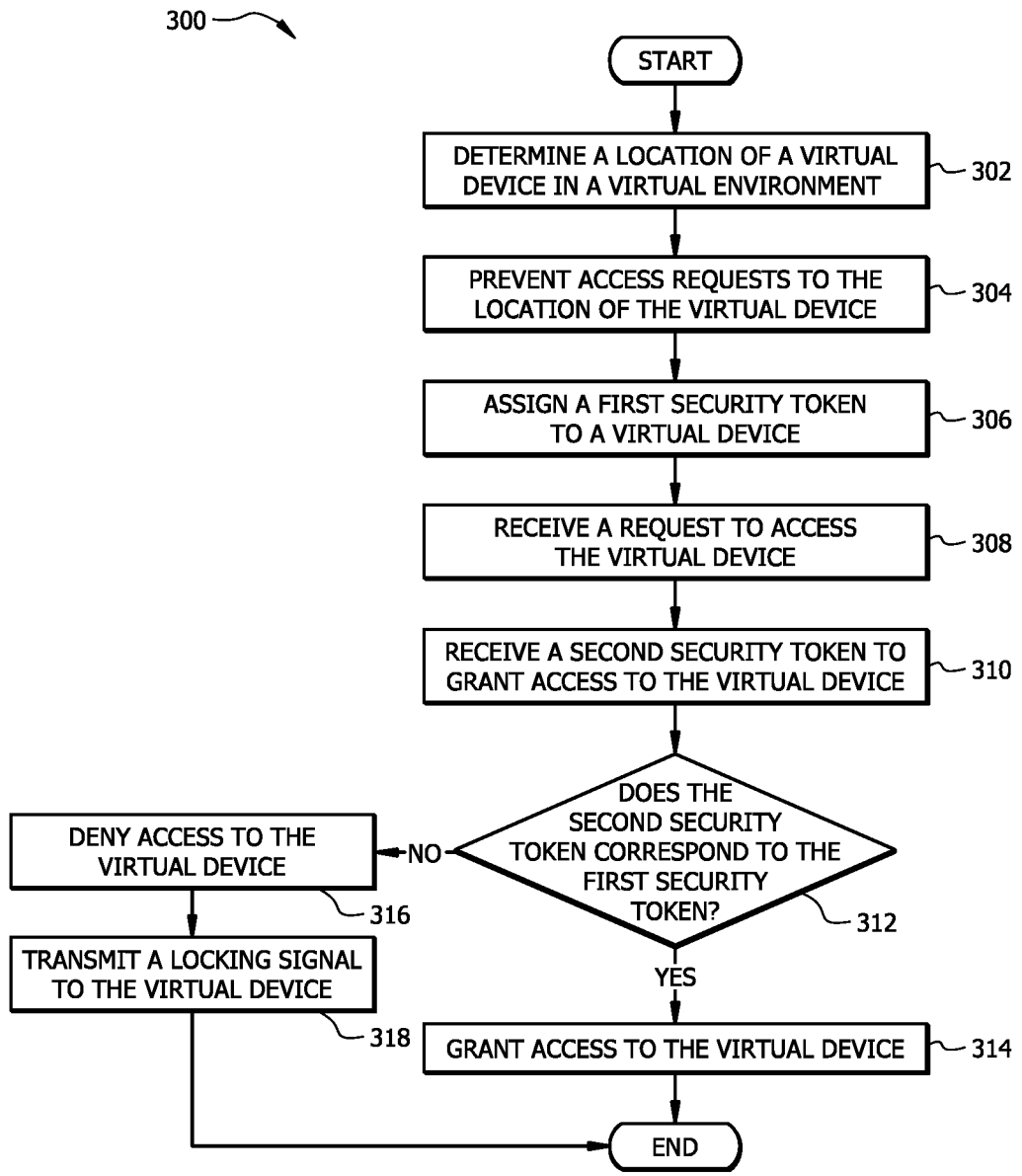
FIG. 3 illustrates an example flowchart of a method for implementing secured access to virtual devices in virtual environments and corresponding physical devices in a real-world environment using security tokens.

As described above, previous technologies fail to provide efficient and reliable solutions to implement secured access to virtual devices in virtual environments and corresponding physical devices in a real-world environment using security tokens. Embodiments of the present disclosure and its advantages may be understood by referring to FIGS. 1 through 3. FIGS. 1 through 3 are used to describe systems and methods for implementing secured access to virtual devices in virtual environments and corresponding physical devices in a real-world environment using security tokens.

System Overview

FIG. 1 illustrates an embodiment of a system 100 that is configured to implement secured access to virtual devices 314 in virtual environments 130 and corresponding physical devices 316 in a real-world environment using security tokens 150. Therefore, the system 100 is integrated into a practical application of improving security of virtual and physical devices 314, 316 from unauthorized access. This, in turn, provides an additional practical application of improving information security of data stored in the virtual and physical devices 314, 316. In certain embodiments, the system 100 comprises a security device 140 communicatively coupled to a computing device 120 and one or more physical devices 316a-b via a network 110. Network 110 enables communication among the components of the system 100. The security device 140 comprises a processor 142 in signal communication with a memory 146. Memory 146 stores software instructions 148 that when executed by the processor 142 cause the security device 140 to perform one or more operations described herein. for example, when the software instructions 148 are executed, the security device 140 generates security tokens 150 and assigns each security token 150 to a different virtual device 314 and a respective physical device 316. In other embodiments, system 100 may not have all of the components listed and/or may have other elements instead of, or in addition to, those listed above.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Computing Device

A computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The computing device 120 may include a user interface, such as a display, a microphone, a camera, keypad, or other appropriate terminal equipment usable by user 102. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices and components of the system 100 via the network 110.

The computing device 120 includes and/or operably coupled with a camera 124. The Camera 124 may be or include any camera that is configured to capture images of a field of view in front of the computing device 120 and/or in front of the camera 124. Examples of the camera 124 may include charge-coupled device (CCD) cameras and complementary metal-oxide semiconductor (CMOS) cameras. The camera 124 is configured to capture images of a user 102 within a real environment. The camera 124 is a hardware device that is configured to capture images continuously, at predetermined intervals, or on-demand. For example, the camera 124 is configured to receive a command from user 102 to capture an image. In another example, the camera 124 is configured to continuously capture images to form a video stream of images. The camera 124 may transmit the captured images and/or video stream to the security device 140. The security device 140 may use the images to identify the user 102 based on a comparison between a received image and a previously provided image of the user 102 in the user information 175, 178.

The computing device 120 is configured to display a two-dimensional (2D) or three-dimensional (3D) representation of a virtual environment 130 to a user. Examples of a virtual environment 310 include, but are not limited to, a graphical or virtual representation of a metaverse, a map, a city, a building interior, a landscape, a fictional location, an alternate reality, or any other suitable type of location or environment.

Virtual Environment

A virtual environment 130 may be configured to use realistic or non-realistic physics for the motion of objects within the virtual environment 130. The virtual environment 130 may be maintained by any device, such as the security device 140, a mesh network of computing devices, and the like. For example, some virtual environments 130 may be configured to use gravity whereas other virtual environments 130 may be configured not to use gravity. Within the virtual environment 130, each user 102 may be associated with an avatar 104. An avatar 104 is a graphical representation of the user 102 within the virtual environment 130. Examples of avatars 104 include, but are not limited to, a person, an animal, or an object. In some embodiments, the features and characteristics of the avatar 104 may be customizable and user-defined. For example, the size, shape, color, attire, accessories, or any other suitable type of appearance features may be specified by a user 102. By using an avatar 104, a user 102 is able to move within the virtual environment 130 to interact with other avatars 104, entities, and objects within the virtual environment 130.

Virtual devices 314a-b may be located at locations 312a-b in the virtual environment 130, respectively. The avatar 104 associated with the user 102 may travel to the locations 312a to access the virtual device 314a. Similarly, the avatar 104 may travel to the location 312b to access the virtual device 314b. each of the virtual devices 314a-b may be an instance of a virtual device 314. The virtual device 314 may be a virtual representation of a physical device 316. Examples of the virtual device 314 include, but are not limited to, a virtual personal computer, a virtual desktop computer, a virtual workstation, a virtual server, a virtual laptop, a virtual tablet computer, a virtual mobile phone (such as a smartphone), a virtual machine, or any other suitable type of device. The virtual device 314 may be used to perform any task of an organization in the virtual environment 130. The virtual device 314 may include a user interface, such as a display, a microphone, a camera, keypad, or other appropriate terminal equipment usable by avatars 104. The virtual device 314 may be operated by a computer system in the real world. For example, the virtual device 314 may be operated by a hardware processor, memory, and/or circuitry (not explicitly shown) configured to perform any of the functions or actions of the virtual device 314 described herein. For example, a software application designed using software code may be stored in the memory and executed by the processor to perform the functions of the virtual device 314. The virtual device 314 is configured to communicate with other devices and components of the system 100 via the network 110.

Each computing device 120 is further configured to allow a user 102 to send requests and generally communicate with the security device 140. For example, a user 102 may use a computing device 120 to send a request 154 (e.g., a request message) to access a virtual device 312. An example of this process is described in more detail below in FIG. 2.

The user 102 may use the computing device 120 to access the application 122. The application 122 may include interfaces that the user 102 can use to operate the avatar 104 in the virtual environment 130. The application 122 may be a web application, a software application, and/or a mobile application. The user 102 is able to login to the application 122 from the computing device 120, access the virtual environment 130, view the representation of the virtual environment 130 on the display of the computing device 120, and operate the avatar 104 (associated with the user 102) in the virtual environment 130.

Physical Device

Each of the physical devices 316a-b is an instance of a physical device 316. A physical device 316 is generally any device that is configured to process data and interact with users 102. Examples of the physical device 316 include, but are not limited to, a personal computer, a desktop computer, a workstation, a server, a laptop, a tablet computer, a mobile phone (such as a smartphone), an Internet-of-Things (IoT) device, or any other suitable type of device. The physical device 316 may include a user interface, such as a display, a microphone, a camera, keypad, or other appropriate terminal equipment usable by user 102. The physical device 316 may include a hardware processor, memory, and/or circuitry (not explicitly shown) configured to perform any of the functions or actions of the physical device 316 described herein. For example, a software application designed using software code may be stored in the memory and executed by the processor to perform the functions of the physical device 316. The physical device 316 is configured to communicate with other devices and components of the system 100 via the network 110. The physical device 316 may be used to perform any task of the organization in the real-world. A virtual device 314 and a respective physical device 316 may be associated with the same organization.

Each virtual device 314 may be a virtual representation of a physical device 316 in the real-world environment. For example, the virtual device 314a may be a virtual representation of the physical device 316a, and the virtual device 314b may be a virtual representation of the physical device 316b. A virtual device 314 may be associated with and/or include virtual resources (e.g., virtual memory and processing resources, virtual data, etc.). The virtual resources of the virtual device 316 may reflect and/or be associated with physical resources (e.g., memory and processing resources, data, etc.) associated with a respective physical device 316.

Changes and updates to the virtual device 314 may reflect on the respective physical device 316, and vice versa. For example, if data is stored in a virtual memory of the virtual device 314, the data may also be stored in the memory of the physical device 314. In another example, if data is changed (added, removed, edited, etc.) in virtual memory of the virtual device 314, the change may be reflected on the corresponding device in the memory of the physical device 314. In another word, a virtual device 314 may be a virtual mirror of a respective physical device 316. Therefore, if a bad actor gains unauthorized access to the virtual device 314, it is as if the bad actor has gained to the physical device 316 and information stored in it and vice versa. Therefore, it is crucial to provide secure access to the virtual devices 314 as well as the physical devices 316. The present disclosure provides a technology that provisions secure access to the virtual devices 314 as well as the physical devices 316.

Security Device

Security device 140 is generally a hardware device that is configured to process data and communicate with other components of the system 100 via the network 110. The security device 140 is further configured to provide services and software and/or hardware resources to computing devices 120, virtual devices 314, physical devices 316, and other components of the system 100. The security device 140 is further configured to perform one or more operations described further below and in conjunction with the operational flow 200 described in FIG. 2, and the method 300 described in FIG. 3.

The security device 140 comprises a processor 142 operably coupled with a network interface 144 and a memory 146. Processor 142 comprises one or more processors operably coupled to the memory 146. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). For example, one or more processors may be implemented in cloud devices, servers, virtual environments, and the like. The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an ALU for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 148) to perform the operations of the security device 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more operations of method 300 as described in FIG. 3.

Network interface 164 is configured to enable wired and/or wireless communications. The network interface 164 may be configured to communicate data between the security device 140 and other devices, systems, or domains. For example, the network interface 164 may comprise an NFC interface, a Bluetooth interface, a Zigbee interface, a Z-wave interface, a radio-frequency identification (RFID) interface, a WIFI interface, a LAN interface, a WAN interface, a MAN interface, a PAN interface, a WPAN interface, a modem, a switch, and/or a router. The processor 142 may be configured to send and receive data using the network interface 164. The network interface 164 may be configured to use any suitable type of communication protocol.

The memory 146 may be volatile or non-volatile and may comprise ROM, RAM, TCAM, DRAM, and SRAM. The memory 146 may include one or more of a local database, cloud database, NAS, etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-3 along with any other data, instructions, logic, rules, or code operable to implement the function(s) described herein when executed by processor 142. For example, the memory 146 may store software instructions 148, security tokens 150, message 150, request 154, token generator 156, token assignment request message 158, token assignment completion message 160, locking signal 162, virtual world information 174, real-world information 177, and/or any other data or instructions. The software instructions 148 may comprise any suitable set of instructions, logic, rules, or code that is executed by the processor 142 to perform the functions described herein, such as some or all of those described in FIGS. 1-3. Each security token 150 may be associated with a particular virtual device 314 and a respective physical device 316. For example, the security token 150a may be mapped, assigned, or designated to the virtual device 314a and physical device 316a, and the security token 150b may be mapped, assigned, or designated to the virtual device 314b and physical device 316b.

The virtual environment information 174 comprises user information 175 and environment information 176. The user information 175 generally comprises information that is associated with any accounts or profiles that can be used within a virtual environment 130. For example, user information 175 may comprise user profile information, online account information, avatar information, digital resources information, or any other suitable type of information that is associated with a user 102 and their avatar 104 within a virtual environment 130. The environment information 176 generally comprises information about the appearance of a virtual environment 130. For example, the environment information 176 may comprise information associated with objects, landmarks, buildings, structures, avatars, entities, virtual devices 314, or any other suitable type of element that is present within a virtual environment 130. In some embodiments, the environment information 176 may be used to create a representation of a virtual environment 130 for users 102. In this case, a virtual environment 130 may be implemented using any suitable type of software framework or engine.

The real-world information 177 comprises user information 178 and environment information 179. The user information 178 generally comprises information that is associated with any accounts or profiles that can be used within the real world. For example, user information 164 may comprise user profile information, account information, real-world resource information, or any other suitable type of information that is associated with a user 102 within a real-world environment. The environment information 179 generally comprises information that is associated with an entity (e.g., organizations, physical devices 316) within the real world. For example, the environment information 179 may include information associated with an entity that the user 102 may or may not be a member of or is associated with. For example, the environment information 179 may comprise addresses, phone numbers, email addresses, contact names, or any other suitable type of information that is associated with an entity. Since the data transfer device 150 has access to both the virtual environment information 174 and the real-world information 177, the data transfer device 150 is able to link together the virtual environment information 174 and the real-world information 177 (e.g., for a user 102) such that changes to the virtual environment information 174 affect or propagate to the real-world information 177 and vice-versa. For example, when a particular security token 150 is assigned to a virtual device 314, the particular security token 150 may be assigned to a respective physical device 316, and vice versa.

Token Generator

Token generator 156 stored in the memory 146 may be implemented by the processor 142 executing the software instructions 148, and is generally configured to generate security tokens 150. In certain embodiments, each security token 150 may include a random number or a random alphanumeric string. In certain embodiments, the token generator 156 may include a random number generator algorithm and/or an alphanumeric string generator algorithm that is configured to generate a random number and/or a random alphanumeric string as a token 150. The security token 150 may not be altered or otherwise changed. In certain embodiments, each security token 150 may be associated with and/or mapped with a particular virtual device 314 and a respective physical device 316. A security token 150 may be used to prevent unauthorized access to a respective virtual device 314 and a respective physical device 316. For example, the security token 150 may be or represent an access key (e.g., password) for accessing the respective virtual device 314 and the respective physical device 316.

Example Operational Flow for Provisioning Secure Access to Virtual and Physical Devices FIG. 2 illustrates an example operational flow 200 of system 100 of FIG. 1 for provisioning secure access to virtual devices 314 and physical devices 316. The operational flow 200 may begin when it is determined to provide secure access to the virtual devices 314 associated with an organization 106 in the virtual environment 130, e.g., in response to detecting an unauthorized attempt to access the virtual device 314 and/or the physical device 316 by a bad actor. For example, the security device 140 associated with the organization 106 may be configured to provide secure access to the virtual devices 314 associated with the organization 106. For example, assume that the virtual device 314a is associated with the organization 106 that the security device 140 is associated with. In the same or another example, assume that the physical device 316a is associated with the organization 106. The corresponding description below described providing secure access to the virtual device 314a and physical device 316a.

Assigning a Security Token to a Virtual Device

The security device 140 may locate the virtual device 314a in the virtual environment 130. In this process, the security device 140 may determine a virtual global positioning system (GPS) coordinates of the virtual device 314a. For example, the security device 140 may access a virtual map of the virtual environment 130 and determine a location 312a of the virtual device 314a.

The security device 140 may access the virtual device 314a. For example, the security device 140 may instruct an avatar 104 to travel to the location 312a of the virtual device 314a. The avatar 104 may be associated with a user 102 who is a member of the organization 106. The user 102 may operate the avatar 104 from the computing device 120, similar to that described in FIG. 1. For example, the security device 140 may communicate a request message 164 to the computing device 120, where the request message 162 includes instructions for the avatar 104 to travel to the location 312b of the virtual device 314b.

The security device 140 may receive a message 152 that indicates the avatar 104 has reached the location 312a of the virtual device 314a. For example, when the avatar 104 reaches the location 312a of the virtual device 314a, the user 102 transmits the message 152 to the security device 140 from the computing device 120. In response to receiving the message 152, the security device 140 may determine that it is time to assign a security token 150a to the virtual device 314a.

In certain embodiments, the virtual device 314a may be located in a virtual data center where multiple organizations store and maintain their virtual devices. Thus, in certain embodiments, the security device 140 may prevent access requests to the location 312a of the virtual device 314a so that avatars associated with other organizations (or any avatar not associated with the organization 106) may not enter the virtual data center and the location 312a while the security token 150a is being assigned to the virtual device 314a.

The security device 140 may assign a security token 150a to the virtual device 314a. For example, the security device 140 may assign the security token 150a to the virtual device 314a remotely via an application programming interface (API) request that includes assignment or installation instructions of the security token 150a to the virtual device 314a. In another example, the security device 140 may instruct the avatar 104 to assign a security token 150a to the virtual device 314a. For example, the security device 140 may transmit a token assignment request message 158 to the computing device 120 requesting the user 102 to assign the security token 150a to the virtual device 314a. The token assignment request message 158 may include an identifier of the virtual device 314a, the location 312a, the security token 150a, and/or any other information and instructions required to perform the security token assignment. In response, the user 102 may operate the avatar 104 to assign the security token 150a to the virtual device 314a. It is assumed that the security device 140 has already generated the security token 150a by implementing the token generator 156, similar to that described in FIG. 1.

In certain embodiments, assigning the security token 150a to the virtual device 314a may include programming or setting up the security token 150a into the virtual device 314a as an access key or access credential. When the security token 150a is assigned to the virtual device 314a, the user 102 may transmit a completion message 160 indicating that the security token 150a is assigned to the virtual device 314a to the security device 140. The security device 140 may perform similar operations to assign other security tokens 150 to other virtual devices 314.

In certain embodiments, assigning the security token 150a to the virtual device 314a may reflect in the real world, such that the security token 150a is also assigned (e.g., programmed or setup) to the physical device 316a that is associated with the virtual device 314a. For example, in some cases, assume that access to the physical device 316a is limited or otherwise the physical device 316a is not accessible physically and/or remotely, e.g., due to poor local network connection. In another example, the physical device 316a may not be accessible from the computing device 120, however, the physical device 316a may be communicatively connected to the virtual device 314a and the security device 140. In another example, the physical device 316a may be physically taken by a bad actor in an attempt to access files stored in the physical device 316a. In such cases, the physical device 316a may be assigned with the security token 150a via the virtual device 314a. In this manner, the security token 150a may be used to prevent unauthorized access to both virtual device 314a and the physical device 316a. In cases where the security device 140 and/or the computing device 120 are communicatively coupled with the physical device 316a, the security token 150a may be assigned (e.g., communicated, installed, and programmed) to the physical device 316a via the security device 140 and/or the computing device 120. In security token 150a may be assigned to the virtual device 314a and the physical device 316a in any other suitable manner. The organization 106 and/or the security device 140 may share the security token 150a with authorized users 102 to access the virtual device 314a and physical device 316a.

In certain embodiments, instructing the avatar 104 to assign the security token 150a to the virtual device 314a may be in response to detecting an unauthorized attempt to access the virtual device 314a, e.g., by a bad actor operating an avatar in the virtual environment 130.

In certain embodiments, instructing the avatar 104 to assign the security token 150a to the virtual device 314a may be in response to detecting an unauthorized attempt to access the physical device 316a, e.g., by a bad actor via physical access and/or cyber-attacks.

In certain embodiments, instructing the avatar 104 to assign the security token 150a to the virtual device 314a may be in response to detecting an unauthorized attempt to access the virtual device 314b that is associated with the same organization 106 as the virtual device 314a.

In certain embodiments, instructing the avatar 104 to assign the security token 150a to the virtual device 314a may be in response to detecting an unauthorized attempt to access the physical device 316b that is associated with the same organization 106 as the virtual device 314a.

Verifying the Security Token for Granting Access to the Virtual Device

The security device 140 is configured to verify a security token 150a that is received from a user or an avatar to grant access to the virtual device 314a. The corresponding description below describes an example operation for verifying a security token. For example, assume that the security device 140 receives a request 154 to access the virtual device 314a. The request 154 may be sent from the avatar 104, another avatar, the user 102, another user, or a bad actor. In the illustrated example, assume that the request 154 is from another avatar 202 being operated and associated with another user from another computing device 120. The other user may initiate the request 154 from the other computing device 120. The security device 140 also receives a second security token 150 from the other user for granting access to the virtual device 314a. For example, the other user may try to access the virtual device 314a by presenting (e.g., entering) the second security token to the virtual device 314a. The virtual device 314a may forward the second security token to the security device 140. The security device 140 may receive the second security token. The security device 140 may compare the second security token with the first security token 150a. In response to determining that the second security token corresponds to the first security token 150a, the security device 140 may grant access of the virtual device 314a to the other user and the respective avatar 202.

In response to determining that the second security token does not correspond to the first security token 150a, the security device 140 may deny access to the virtual device 314a. The security device 140 may also transmit a locking signal 162 to the virtual device 314a, where the locking signal 162 causes the virtual device 314a to be locked. In response, access to the virtual device 314a may be blocked or prevented, e.g., until authorized personnel or an authorized avatar manually (or remotely) unlocks the virtual device 314a. The same may happen for the physical device 316a, such that the physical device 316a may be locked.

In certain embodiments, the locking signal 162 may be transmitted in response to determining more than a threshold number of unsuccessful attempts to access the virtual device 314a by inputting incorrect security code in less than a threshold period (e.g., more than ten attempts in five minutes).

Verifying the Security Token for Granting Access to a Physical Device

The security device 140 may be configured to evaluate security tokens that users provide to access physical devices 316 associated with the virtual devices 314. In an example operation, the security device 140 may receive a second request 154 to access the physical device 316a. For example, the second request 154 may be from a user other than the user 102. The second request 154 may be received from a user device 120 associated with the other user in the real-world environment.

The security device 140 may also receive a third security token for granting access to the physical device 316a from the other user via the user device 120. The security device 140 may compare the third security token with the security token 150a. The security device 140 may determine whether the third security token corresponds to the security token 150a. In response to determining that the third security token corresponds to the security token 150a, the security device 140 may grant access to the physical device 316a to the other user who initiated the second request 154. Otherwise, the security device 140 may deny access to the physical device 316a. The security device 140 may also transmit the locking signal 162 to the physical device 316a, where the locking signal 162 may cause the physical device 316a to be locked. In response, access to the physical device 316a may be blocked or prevented, e.g., until an authorized personnel manually (or remotely) unlocks the physical device 316a.

Assigning a Second Security Token to a Second Virtual Device

In certain embodiments, the security device 140 may perform similar operations for assigning a security token 150a to the virtual device 314b. In this process, the security device 140 may determine a location 312b of the virtual device 314b in the virtual environment 130, similar to that described above with respect to determining the location 312a of the virtual device 314a. The security device 140 may access the virtual device 314b. For example, the security device 140 may instruct the avatar 104 to travel to the location 312b of the virtual device 314b. The security device 140 may communicate a request message 164 to the computing device 120, where the request message 162 includes instructions for the avatar 104 to travel to the location 312b of the virtual device 314b. In response, the user 102 may operate the avatar 104 to travel to the location 312b of the virtual device 314b. The security device 140 may receive a message (from the computing device 120) indicating that the avatar 104 has reached the location 312b of the virtual device 314b, similar to that described above.

The security device 140 may prevent access requests to the location 312b in response to receiving the message, similar to that described above.

The security device 140 may assign the security token 150b to the virtual device 314b, similar to that described above. For example, the security device 140 may assign the security token 150b to the virtual device 314b remotely via an API request that includes assignment or installation instructions of the security token 150b to the virtual device 314b. In another example, the security device 140 may instruct the avatar 104 to assign the security token 150b to the virtual device 314b. In this example, the security device 140 may transmit a token assignment request message 158 to the computing device 120 requesting the user 102 to assign the security token 150b to the virtual device 314b. The token assignment request message 158 may include an identifier of the virtual device 314b, the location 312b, the security token 150b, and/or any other information and instructions required to perform the security token assignment. In response, the user 102 may operate the avatar 104 to assign the security token 150b to the virtual device 314b, similar to that described above.

The security device 140 is configured to verify a security token that is received from a user or an avatar to grant access to the virtual device 314b. The security device 140 may receive a request 154 to access the virtual device 314b. The request 154 may be from a user other than the user 102 or avatar 202. The security device 140 may also receive a fifth security token (from the other user or avatar 202) for accessing the virtual device 314b. The security device 140 may compare the fifth security token with the security token 150b. If the security device 140 determines that the fifth security token corresponds to the security token 150b, the security device 140 may grant access to the virtual device 314b. Otherwise, the security device 140 may deny access of the virtual device 314b to the other user or avatar 202. The security device 140 may also transmit the locking signal 162 to the virtual device 314b to lock the virtual device 314b, similar to that described above.

Example Method for Provisioning Secure Access to Virtual Devices and Physical Devices FIG. 3 illustrates an example flowchart of a method 300 for provisioning secure access to virtual device 314 and physical devices 316. Modifications, additions, or omissions may be made to method 300. Method 300 may include more, fewer, or other operations. For example, operations may be performed in parallel or in any suitable order. While at times discussed as the system 100, security device 140, computing device 120, or components of any of thereof performing operations, any suitable system or components of the system may perform one or more operations of the method 300. For example, one or more operations of method 300 may be implemented, at least in part, in the form of software instructions 148 of FIG. 1, stored on non-transitory, tangible, machine-readable media (e.g., memory 146 of FIG. 1) that when run by one or more processors (e.g., processor 142 of FIG. 1) may cause the one or more processors to perform operations 302-318.

At operation 302, the security device 140 determines a location 312a of a virtual device 314a in a virtual environment 130, similar to that described in FIG. 2. At operation 304, the security device 140 prevents (or denies) access requests to the location 312a of the virtual device 314a. For example, the security device 140 may deny access requests from other entities, avatars, users to access the data center that the virtual device 314a is maintained.

At operation 306, the security device 140 assigns a first security token 150a to the virtual device 314a, similar to that described in FIG. 2. For example, the security device 140 may assign the first security token 150a remotely or by instructing the avatar 104 to assign the first security token 150a to the virtual device 134a, similar to that described in FIG. 2.

At operation 308, the security device 140 receives a request 154 to access the virtual device 314a. For example, a user may initiate the request 154 from a user device 120, similar to that described in FIG. 2.

At operation 310, the security device 140 receives a second security token to grant access to the virtual device 314a. For example, the user may transmit the second security token to the security device 140 from the user device 120.

At operation 312, the security device 140 determines whether the second security token corresponds to the first security token 150a. In this process, the security device 140 may compare the second security token with the first security token 150a. If it is determined that the second security token corresponds to the first security token 150a, method 300 proceeds to operation 314. Otherwise, method 300 proceeds to operation 316.

At operation 314, the security device 140 grants access to the virtual device 314a, such that the avatar 104 (and the user 102) is able to access and view the files and other data stored in a memory associated with the virtual device 314a.

At operation 316, the security device 140 denies access to the virtual device 314a. At operation 318, the security device 140 transmits a locking signal 162 to the virtual device 314a. The security device 140 may also transmit the locking signal 162 to the physical device 316a.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for provisioning secured access to devices comprising:
a memory configured to store a first security token; and
a processor operably coupled to the memory, and configured to:
determine a location of a first virtual device in a virtual environment, wherein the location of the first virtual device comprises virtual global positioning system (GPS) coordinates of the virtual device in the virtual environment;
access the first virtual device in the virtual environment by instructing a first avatar to travel to the location of the first virtual device in the virtual environment;
prevent access requests to the location where the first virtual device is located so that avatars other than the first avatar may not travel to the location of the first virtual device in the virtual environment;
assign the first security token to the first virtual device, wherein the first security token is used to prevent unauthorized access to the first virtual device;
receive a first request to access the first virtual device, wherein the first request is received from the first avatar;
receive a second security token to grant access to the first virtual device;
compare the second security token with the first security token;
determine whether the second security token corresponds to the first security token;
in response to determining that the second security token corresponds to the first security token, grant the first avatar access to the first virtual device;
in response to determining that the second security token does not correspond to the first security token:
deny the first avatar access to the first virtual device; and
transmit a locking signal to the first virtual device, wherein the locking signal causes the first virtual device to be locked.

2. The system of claim 1, wherein:
the first virtual device is a virtual representation of a first physical device in a real-world environment;
in response to assigning the first security token to the first virtual device, the first security token is assigned to the first physical device; and
the first security token is further used to prevent unauthorized access to the first physical device.

3. The system of claim 2, wherein the processor is further configured to:
receive a second request to access the first physical device, wherein the second request is received from a second user in the real-world environment;
receive a third security token to grant access to the first physical device;
determine whether the third security token corresponds to the first security token;
in response to determining that the third security token corresponds to the first security token, grant the second user access to the first physical device;
in response to determining that the third security token does not correspond to the first security token:
deny the second user access to the first physical device; and
transmit the locking signal to the first physical device, wherein the locking signal causes the first physical device to be locked.

4. The system of claim 1, wherein:
the memory is further configured to store a fourth security token that is different from the first security token;
the processor is further configured to:

determine a second location of a second virtual device in the virtual environment;

access the second virtual device in the virtual environment;

prevent access requests to the second location where the second virtual device is located;

assign the fourth security token to the second virtual device, wherein the fourth security token is used to prevent unauthorized access to the second virtual device;

receive a third request to access the second virtual device, wherein the third request is received from a second avatar;

receive a fifth security token to grant access to the second virtual device;

determine whether the fifth security token corresponds to the fourth security token;

in response to determining that the fifth security token corresponds to the fourth security token, grant the second avatar access to the second virtual device;

in response to determining that the fifth security token does not correspond to the fourth security token:
deny the second avatar access to the second virtual device; and
transmit the locking signal to the second virtual device, wherein the locking signal causes the second virtual device to be locked.

5. The system of claim 1, wherein assigning the first security token to the first virtual device is in response to detecting an unauthorized attempt to access the first virtual device.

6. The system of claim 1, wherein assigning the first security token to the first virtual device is in response to detecting an unauthorized attempt to access a first physical device, wherein the first virtual device is a virtual representation of the first physical device in a real-world environment.

7. The system of claim 1, wherein:
the first virtual device and a second virtual device are associated with one organization; and
assigning the first security token to the first virtual device is in response to detecting an unauthorized attempt to access the second virtual device.

8. A method for provisioning secured access to devices comprising:
determining a location of a first virtual device in a virtual environment, wherein the location of the first virtual device comprises virtual global positioning system (GPS) coordinates of the virtual device in the virtual environment;
accessing the first virtual device in the virtual environment by instructing a first avatar to travel to the location of the first virtual device in the virtual environment;
preventing access requests to the location where the first virtual device is located so that avatars other than the first avatar may not travel to the location of the first virtual device in the virtual environment;
assigning a first security token to the first virtual device, wherein the first security token is used to prevent unauthorized access to the first virtual device;
receiving a first request to access the first virtual device, wherein the first request is received from the first avatar;
receiving a second security token to grant access to the first virtual device;
comparing the second security token with the first security token;

determining whether the second security token corresponds to the first security token;

in response to determining that the second security token corresponds to the first security token, granting the first avatar access to the first virtual device;

in response to determining that the second security token does not correspond to the first security token:
denying the first avatar access to the first virtual device; and
transmitting a locking signal to the first virtual device, wherein the locking signal causes the first virtual device to be locked.

9. The method of claim 8, wherein:
the first virtual device is a virtual representation of a first physical device in a real-world environment;
in response to assigning the first security token to the first virtual device, the first security token is assigned to the first physical device; and
the first security token is further used to prevent unauthorized access to the first physical device.

10. The method of claim 9, further comprising:
receiving a second request to access the first physical device, wherein the second request is received from a second user in the real-world environment;
receiving a third security token to grant access to the first physical device;
determining whether the third security token corresponds to the first security token;
in response to determining that the third security token corresponds to the first security token, granting the second user access to the first physical device;
in response to determining that the third security token does not correspond to the first security token:
denying the second user access to the first physical device; and
transmitting the locking signal to the first physical device, wherein the locking signal causes the first physical device to be locked.

11. The method of claim 8, wherein:
storing a fourth security token that is different from the first security token in a memory;
determining a second location of a second virtual device in the virtual environment;
accessing the second virtual device in the virtual environment;
preventing access requests to the second location where the second virtual device is located;
assigning the fourth security token to the second virtual device, wherein the fourth security token is used to prevent unauthorized access to the second virtual device;
receiving a third request to access the second virtual device, wherein the third request is received from a second avatar;
receiving a fifth security token to grant access to the second virtual device;
determining whether the fifth security token corresponds to the fourth security token;
in response to determining that the fifth security token corresponds to the fourth security token, granting the second avatar access to the second virtual device;
in response to determining that the fifth security token does not correspond to the fourth security token:
denying the second avatar access to the second virtual device; and transmitting the locking signal to the second virtual device, wherein the locking signal causes the second virtual device to be locked.

12. The method of claim 8, wherein assigning the first security token to the first virtual device is in response to detecting an unauthorized attempt to access the first virtual device.

13. The method of claim 8, wherein assigning the first security token to the first virtual device is in response to detecting an unauthorized attempt to access a first physical device, wherein the first virtual device is a virtual representation of the first physical device in a real-world environment.

14. The method of claim 8, wherein:
the first virtual device and a second virtual device are associated with one organization; and
assigning the first security token to the first virtual device is in response to detecting an unauthorized attempt to access the second virtual device.

15. A non-transitory computer-readable medium storing instructions that, when executed by a processor, cause the processor to:
determine a location of a first virtual device in a virtual environment, wherein the location of the first virtual device comprises virtual global positioning system (GPS) coordinates of the virtual device in the virtual environment;
access the first virtual device in the virtual environment by instructing a first avatar to travel to the location of the first virtual device in the virtual environment;
prevent access requests to the location where the first virtual device is located so that avatars other than the first avatar may not travel to the location of the first virtual device in the virtual environment;
assign a first security token to the first virtual device, wherein the first security token is used to prevent unauthorized access to the first virtual device;
receive a first request to access the first virtual device, wherein the first request is received from the first avatar;
receive a second security token to grant access to the first virtual device;
compare the second security token with the first security token;
determine whether the second security token corresponds to the first security token;
in response to determining that the second security token corresponds to the first security token, grant the first avatar access to the first virtual device;
in response to determining that the second security token does not correspond to the first security token:
deny the first avatar access to the first virtual device; and
transmit a locking signal to the first virtual device, wherein the locking signal causes the first virtual device to be locked.

16. The non-transitory computer-readable medium of claim 15, wherein:
the first virtual device is a virtual representation of a first physical device in a real-world environment;
in response to assigning the first security token to the first virtual device, the first security token is assigned to the first physical device; and
the first security token is further used to prevent unauthorized access to the first physical device.

17. The non-transitory computer-readable medium of claim 16, wherein the instructions when executed by the processor, further cause the processor to:
receive a second request to access the first physical device, wherein the second request is received from a second user in the real-world environment;
receive a third security token to grant access to the first physical device;
determine whether the third security token corresponds to the first security token;
in response to determining that the third security token corresponds to the first security token, grant the second user access to the first physical device;
in response to determining that the third security token does not correspond to the first security token:
deny the second user access to the first physical device; and
transmit the locking signal to the first physical device, wherein the locking signal causes the first physical device to be locked.

18. The non-transitory computer-readable medium of claim 15, wherein the instructions when executed by the processor, further cause the processor to:
determine a second location of a second virtual device in the virtual environment;
access the second virtual device in the virtual environment;
prevent access requests to the second location where the second virtual device is located;
assign a fourth security token to the second virtual device, wherein the fourth security token is used to prevent unauthorized access to the second virtual device and is different from the first security token;
receive a third request to access the second virtual device, wherein the third request is received from a second avatar;
receive a fifth security token to grant access to the second virtual device;
determine whether the fifth security token corresponds to the fourth security token;
in response to determining that the fifth security token corresponds to the fourth security token, grant the second avatar access to the second virtual device;
in response to determining that the fifth security token does not correspond to the fourth security token:
deny the second avatar access to the second virtual device; and
transmit the locking signal to the second virtual device, wherein the locking signal causes the second virtual device to be locked.

19. The non-transitory computer-readable medium of claim 15, wherein assigning the first security token to the first virtual device is in response to detecting an unauthorized attempt to access the first virtual device.

20. The non-transitory computer-readable medium of claim 15, wherein assigning the first security token to the first virtual device is in response to detecting an unauthorized attempt to access a first physical device, wherein the first virtual device is a virtual representation of the first physical device in a real-world environment.

* * * * *